H. P. GENGEMBRE.
Oil Still.

No. 33,699. Patented Nov. 12, 1861.

Witnesses:

Inventor:

UNITED STATES PATENT OFFICE.

H. P. GENGEMBRE, OF TARENTUM, PENNSYLVANIA.

IMPROVEMENT IN APPARATUS FOR DISTILLING COAL-OILS.

Specification forming part of Letters Patent No. 33,699, dated November 12, 1861.

*To all whom it may concern:*

Be it known that I, H. P. GENGEMBRE, of Tarentum, in the county of Allegheny and State of Pennsylvania, have invented a new and useful Improvement in Apparatus for Distilling Hydrocarbon Oils; and I do hereby declare that the following is a full, clear, and exact description of the same, reference being had to the accompanying drawings, forming part of this specification, in which—

Figure 1:
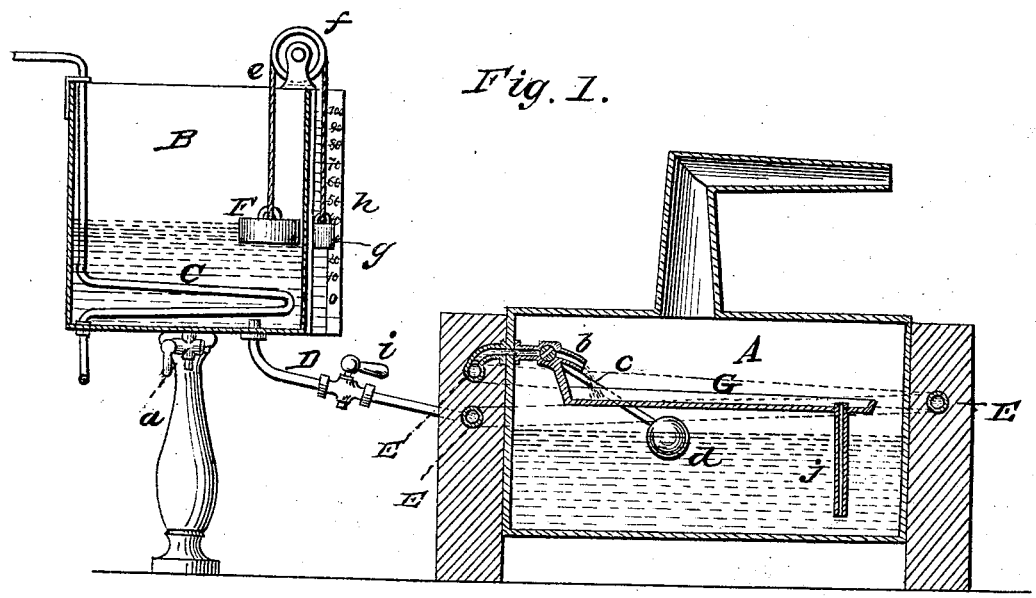
Figure 2:
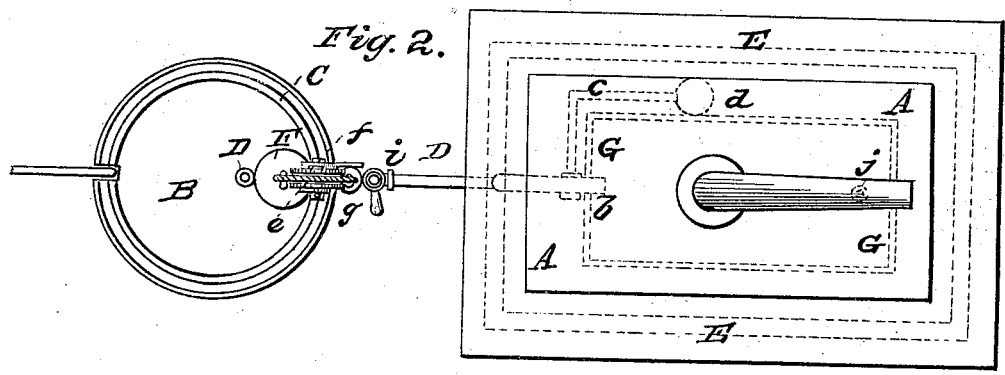

Figure 1 is a vertical section of an apparatus with my improvement. Fig. 2 is a plan of the same.

Similar letters of reference indicate corresponding parts in both figures.

My invention is intended more especially to be applied to apparatus for the distillation of petroleum, but is also applicable to the redistillation of coal-oils.

It consists in certain means of feeding the still, by which the oil is delivered thereinto at a high temperature as fast as the distillation proceeds, so that the quantity in the still is always nearly the same, and by which the boiling over of the still is prevented.

To enable others skilled in the art to make and use my invention, I will proceed to describe its construction and operation.

A is the still, which may be of any convenient or suitable form, and heated by any suitable means.

B is an elevated reservoir or tank for supplying the still, furnished with a steam-coil, C, to warm it to such a degree (about from 80° to 100° Fahrenheit) as will facilitate the separation of water and impurities which settle to the bottom of the reservoir, where a cock, $a$, is provided for drawing them off.

F is a float resting on the oil in the reservoir, and having connected with it, by a cord or chain, $e$, passing over a pulley, $f$, a counter-balance, $g$, which also constitutes an index to a fixed graduated scale, $h$, arranged outside of the reservoir, for the purpose of indicating the quantity of oil in the reservoir at any time and ascertaining the quantity that has been drawn off into the still.

D is the pipe through which the oil leaves the reservoir B to pass to the still. This pipe, which is furnished with a stop-cock, $i$, delivers the oil into a coil, E, which is arranged in the setting of the still, or otherwise, to be heated by the waste heat thereof; and the said coil terminates within the still in a cock, $b$, which is fitted with a lever, $c$, to which is attached a float, $d$, which causes the cock to be opened by the diminution of the quantity of oil in the still, and vice versa. The cock $b$ does not deliver the oil directly into the bulk of oil in the still, but upon a flat or nearly flat tray, G, the area of which may be nearly equal to the horizontal area of the still. This tray is arranged within the still at an elevation above the highest intended level of the bulk of oil, and furnished with an overflow-pipe, $j$, leading down to near the bottom of the still.

The operation of the apparatus is as follows: The oil in the reservoir having been warmed to the proper degree to separate the water and impurities, and the latter having been drawn off, the still is filled to the proper level by opening the cock $i$, the cock $b$ remaining open till the oil arrives to the proper level, and then being closed by the action of the float. Heat is then applied to the still, and when distillation has commenced and the level of the oil has begun to fall the float opens the cock $b$, that the oil carried off by distillation may be replaced by crude or undistilled oil from the reservoir, and the same or very nearly the same level be maintained in the still. The oil, being heated to a high degree in the coil E before entering the still, is not only prevented "spitting" on its entrance, but requires less application of heat within the still, and, being delivered on the tray G and caused to flow over the said tray in a thin sheet exposed to the heat of the still, has its most volatile portion evaporated before it can flow down the pipe $j$ into the bulk of oil below, and by that means the boiling over of the retort is prevented. The operation is thus continued till the accumulation of heavy oils in the still is such as to justify shutting the cock $i$ and discontinuing the application of heat to the still while the oil is drawn off and the still cleaned of its residuum.

What I claim as my invention, and desire to secure by Letters Patent, is—

1. The feeding and heating apparatus consisting of the reservoir B, pipe D, heater E, cock $b$, and float $d$, the whole applied in combination with each other and with the retort, substantially as and for the purpose herein specified.

2. The tray G, applied within the retort, and in combination with a feeding apparatus, substantially as and for the purpose herein specified.

H. P. GENGEMBRE. [L. S.]

Witnesses:
 J. C. EVANS,
 WM. V. EVANS.